United States Patent [19]
Brady, Jr. et al.

[11] Patent Number: 5,123,015
[45] Date of Patent: Jun. 16, 1992

[54] DAISY CHAIN MULTIPLEXER

[75] Inventors: Kenneth A. Brady, Jr., Trabuco Canyon; Richard E. Sklar, Huntington Beach, both of Calif.

[73] Assignee: Hughes Aircraft Company, Los Angeles, Calif.

[21] Appl. No.: 630,713

[22] Filed: Dec. 20, 1990

[51] Int. Cl.$^5$ .............................................. H04J 3/02
[52] U.S. Cl. .................................. 370/112; 370/85.7; 370/105.1; 370/99
[58] Field of Search ................. 370/112, 105.1, 85.7, 370/95.1, 99

[56] References Cited

U.S. PATENT DOCUMENTS

| | | | |
|---|---|---|---|
| 3,995,119 | 11/1976 | Pachynski, Jr. | 370/112 |
| 4,504,943 | 3/1985 | Nagano et al. | 370/112 |
| 4,719,624 | 1/1988 | Bellisio | 370/112 |
| 4,744,082 | 5/1988 | Fujimura et al. | 370/112 |
| 4,893,306 | 1/1990 | Chao et al. | 370/112 |

Primary Examiner—Douglas W. Olms
Assistant Examiner—Min Jung
Attorney, Agent, or Firm—Terje Gudmestad; Jeannette M. Walder; Wanda K. Denson-Low

[57] ABSTRACT

Each unit of a daisy chain of separate and independent multiplexing units (10,12,14) is arranged to accept a group of local audio inputs (Audio 1-Audio 8) and an additional input (18,20,22) from a prior unit in the chain to time division multiplex the additional input with the local units. Each unit provides a single serial bit stream output (20,22,24) which comprises the additional input to the next identical multiplexer unit in the chain. The next multiplexer unit time division multiplexes all of its inputs to provide a single output which includes a serial presentation of its own local inputs and the local inputs of the preceding multiplexer unit of the chain. This single serial output of the next multiplexer next forms the additional input of a still further multiplexer unit of the chain, which itself may have its own local inputs. The third multiplexer unit provides a single output that is a serial presentation of the local inputs of all three multiplexers. Additional multiplexer units can be added to the chain as may be necessary or desirable to accommodate reconfiguration of systems with which the multiplexers are used.

9 Claims, 3 Drawing Sheets

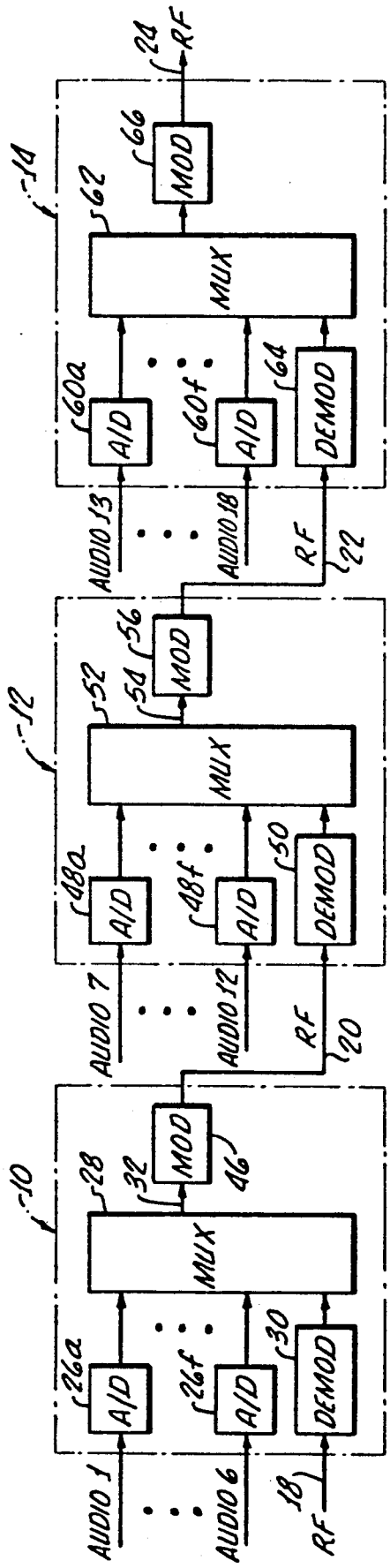

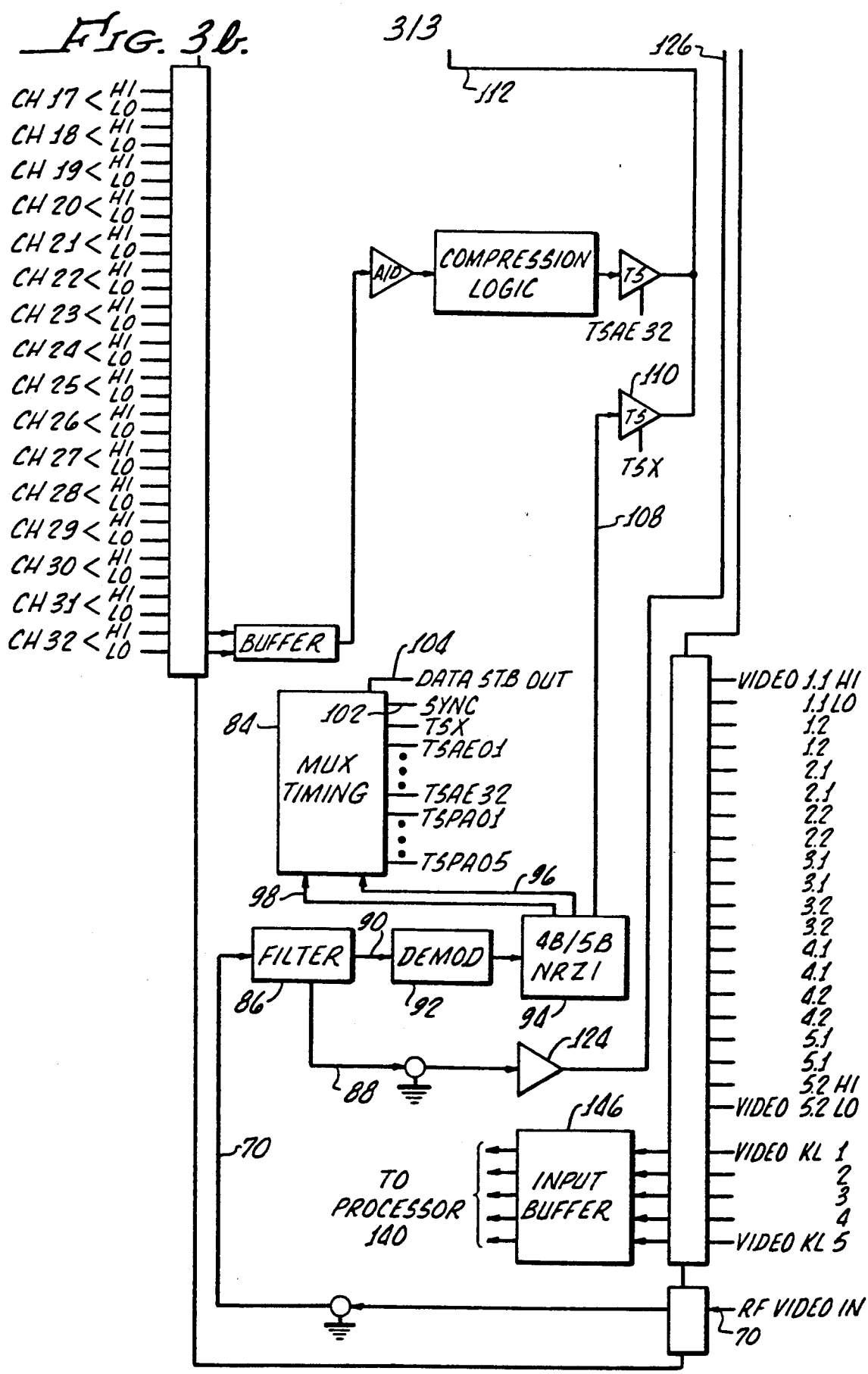

DAISY CHAIN MULTIPLEXER

BACKGROUND OF THE INVENTION

1. Field of the Invention

The present invention relates to method and apparatus for multiplexing signals and more particularly concerns flexible multiplexing that is readily reconfigurable to accommodate different numbers of inputs.

2. Description of Related Art

In various systems that are required to handle a large number of inputs, such as, for example, in an aircraft audio entertainment system, analog signals are generally converted to digital form and then time division multiplexed for transmission to a plurality of listening stations. Commonly, analog to digital conversion and multiplexing take place in hardware mounted in a single box at a single location. If the system with which the multiplexing arrangement is used is to be reconfigured, as when, for example, further seats are added to an aircraft and additional audio sources are used, additional channels of audio information must be transmitted together with the original channels. According to present arrangements, in order to support additional audio channels an entirely new multiplexer box is required. Furthermore, in such systems where both audio and video entertainment is employed, it is generally convenient, if not necessary, to position the audio source or sources (a CD player or tape deck) at locations remote from the location of the video source with its audio signals, such as a video tape reproducer for example. For such a reconfiguration the video audio and the independent audio sources must be connected to the same digitizing box, which results in a significant additional amount of interconnecting wiring.

Accordingly, it is an object of the present invention to provide a multiplexing system which avoids or minimizes above-mentioned problems.

SUMMARY OF THE INVENTION

In carrying out principles of the present invention in accordance with a preferred embodiment thereof, a plurality of multiplexer units are effectively cascaded, connected in a daisy chain, with all multiplexer units employing a common repetitive timing frame that is divided into a plurality of subframes. Each multiplexer is provided with a number of local inputs and is adapted to receive a remote input. The common multiplexer timing frame is arranged so that local inputs of individual multiplexers are uniquely assigned to individual subframes. Input signals derived from the remote input and which correspond to local inputs from a prior multiplexer unit in the chain are assigned to individual subframes, each of which corresponds to an individual one of the prior multiplexer units in the chain.

BRIEF DESCRIPTION OF THE DRAWINGS

In the accompanying drawings:

FIG. 1 is a simplified block diagram of a daisy chain of multiplexer units embodying principles of the present invention.

FIG. 2a is a timing chart showing data in a frame of a first multiplexer in the chain;

FIG. 2b is a timing chart showing data in a frame of a second multiplexer in the chain;

FIG. 2c is a timing chart showing data in the last multiplexer in the chain;

FIGS. 3a and 3b together form a more detailed block diagram of an exemplary one of the multiplexer units of FIG. 1.

DESCRIPTION OF THE PREFERRED EMBODIMENT

Figure 3A:
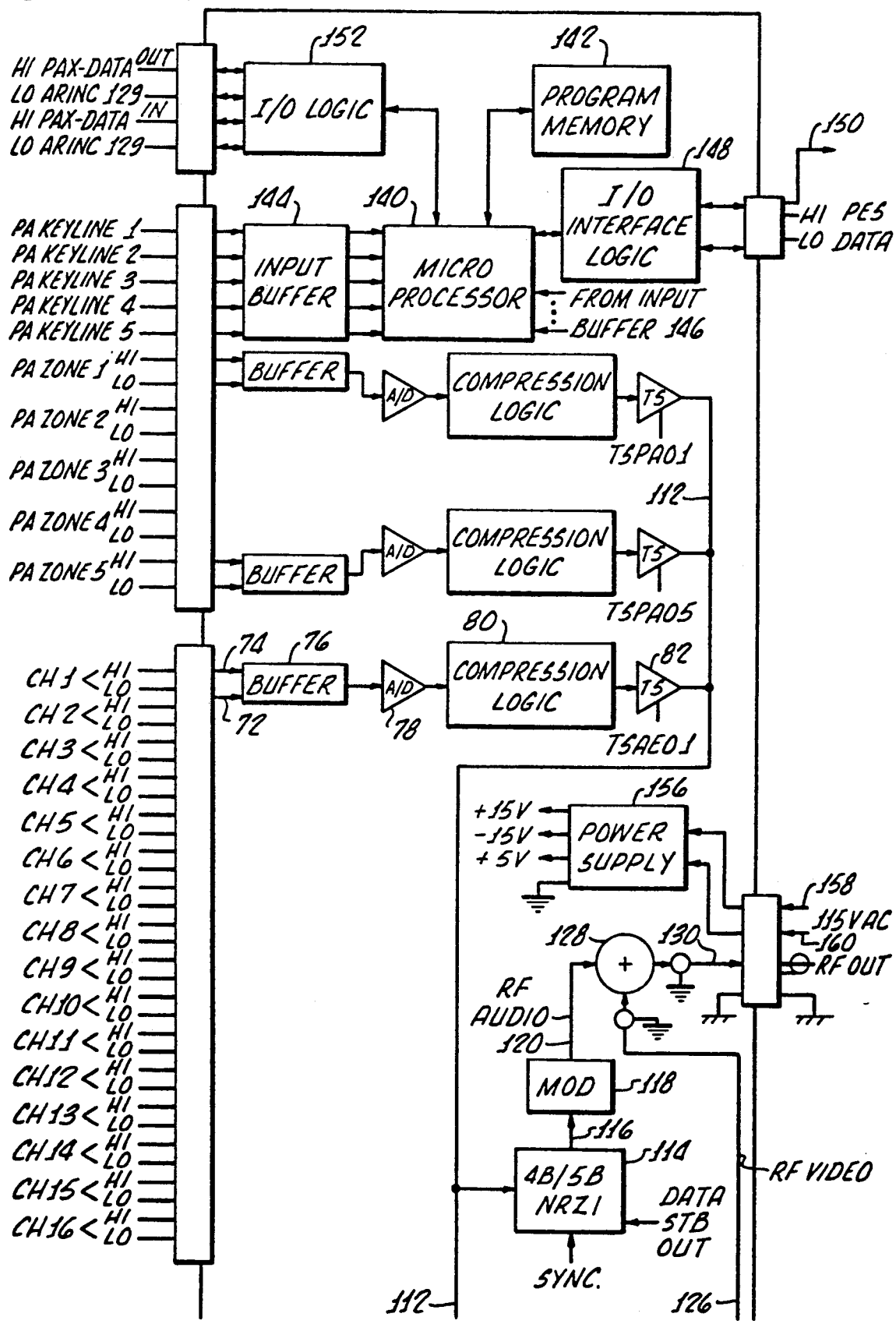

Illustrated in FIG. is a daisy chain of three cascaded multiplexer units 10, 12 and 14, each of which is provided with two types of inputs and a single output. The two types of inputs for unit 10 are first, a group of local analog audio signals, indicated as audio 1 through audio 6, and, second, an RF (radio frequency) signal on a line 18. Multiplexer unit 10 has a single output on a line 20 which provides a remote audio modulated RF signal input for the second multiplexer unit 12 in the chain. The latter has a plurality of local analog audio inputs indicated as audio 7 through audio 12, and like the first multiplexer unit 10, provides a single audio modulated RF output on a line 22. The latter forms the remote input to the third multiplexer unit 14, which has a plurality of local analog audio inputs indicated as audio 13 through audio 18. The third multiplexer unit has an output on a line 24 which comprises the modulated RF output of the multiplexer chain. It will be readily understood that the number of audio inputs, indicated as six for each of the multiplexer units, is selected solely for purposes of exposition, and each multiplexer unit may have fewer or more of such inputs. For example, as the description proceeds, it will be seen that a presently preferred embodiment is provided with 32 inputs for each of the three multiplexer units in a three unit chain, to thereby enable handling of a total of 96 local audio inputs. The audio inputs are audio analog signals that are derived from a suitable analog audio source, such as, for example, a compact disc player, a tape playback machine, or a microphone of a public address system. The RF signal on input line 18 includes additional audio signals which have been digitized and modulated upon a suitable RF carrier. It will be understood that modulation and demodulation is not essential to the present invention, and the multiplexing described herein may operate on signals without any modulation or demodulation.

The three multiplexer units 10, 12 and 14 may be precisely identical, differing only in the nature of the inputs thereto. However, for the first unit 10 of the chain, there may be no remote or RF input on its input line 18. The analog audio signals audio 1 through audio 6 is each fed to an individual one of a plurality (six in this exemplary embodiment) of analog to digital converters 26a through 26f, each of which provides a serial bit stream comprising a digitized version of the analog audio input on a separate one of the input lines to a conventional set of multiplexer switches 28. An additional input to multiplexer switches 28 (provided that there is a remote input on line 18) is provided from the output of a demodulator 30 within the multiplexer unit 10. The demodulator 30, if there is an RF input on line 18, removes from the RF carrier the serial bit stream which comprises digitized audio samples that have been modulated upon the carrier. The multiplexer output on a line 32 may also include a plurality of data bits representing the remote input (if any) that comprises digitized audio signals demodulated from the RF input signal on line 18.

Multiplexer unit 10 includes a timing unit (not shown in FIG. 1), more particularly described below, which sets up a common repetitive timing frame illustrated in FIG. 2a. The train of timing frames is defined by a frame sync at points indicated in FIG. 2a at 34 and 36, and each frame is divided into equal length subframes at points 38,40. Although equal length subframes are presently preferred, it will be understood that the subframes need not be of equal length provided that duration of each remains constant throughout the chain. Each subframe is uniquely assigned to one, and only one, multiplexer unit of the chain. Each of the subframes is divided into a plurality of equal length time slots, with one such time slot being provided for each local input to the multiplexer unit. That is, for each of the inputs audio through audio 6, in this exemplary embodiment, there is provided one time slot of subframe 1 in each frame of the train of frames.

The time slots for subframe 1 of the timing diagram of FIG. 2a are indicated as S1, S2, S3, S4, S5 and S6. For convenience of exposition, the several subframes of the frame are denoted subframe 1, uniquely corresponding to and assigned to multiplexer unit 10, subframe 2, uniquely corresponding to and assigned to multiplexer unit 12, and subframe 3 uniquely corresponding to and assigned to multiplexer unit 14. It will be understood that the drawings illustrate only an example having three subframes corresponding to a daisy chain having three multiplexers. However, the time frame is established to have a number of subframes equal to the maximum number of daisy chain multiplexer units that is expected to be employed in this configurable and reconfigurable system. Thus each frame may have a number of subframes greater than the number of multiplexer units, but never less. As will be seen from the following description, not all subframes contain data. Some are empty.

At the output of multiplexer switches 28 on line 32 appears a serial bit stream of digitized audio samples, with the signals appearing in sequence and with the bits of each sample being assigned to an individual one of the several time slots in a subframe. Each sample, as digitized by the analog to digital converters, may comprise sixteen bits. With such an arrangement each sixteen bits of a single sample will appear in a single time slot, as indicated by the several bits appearing in each of the time slots S1-S6 of subframe 1 of FIG. 2a. The sixteen bits of the next sample of this same signal appear in the same time slot of the next frame, etc. The multiplexer unit timing is arranged to cause the digitized samples of the local inputs of unit 10, namely the digitized samples of inputs audio 1 through audio 6, to be positioned in the respective slots of subframe 1. Because, in the example under discussion, there is no signal at the RF input 18 of multiplexer unit 10, all of the time slots of subframe 2 and subframe 3 are empty for this first unit of the daisy chain. Subframe 2 and subframe 3 are uniquely assigned to multiplexer units 12 and 14, respectively. The frame repeats at a rate which is consistent with the audio sampling rate of the system, on the order of 8000 frames per second to 46000 frames per second. In an exemplary embodiment for handling three separate groups, each of 32 inputs, with a frame rate of 8000 frames per second, the timing provides a single frame duration of approximately 125 microseconds, with each time slot having a duration of 1.3 microseconds.

As previously described, the digitized samples from the A/D converters of multiplexer unit 10 are fed through the time division multiplexer switches 28 to provide the serial bit stream illustrated in slots S1 through S6, with the bits in each slot denoting the amplitude of a single sample of a single one of the audio inputs. The digitized samples are then modulated, in a modulator 46, upon an RF carrier so that the output of the multiplexer unit, which appears at the output of the modulator 46 on line 20, is an RF signal, as previously described, which has modulated thereon a serial bit stream representing digitized samples of a plurality of analog audio signals. This modulated RF signal on line 20 also includes the frame sync signals and is fed to the remote or RF input of the second unit, multiplexer unit 12, in the chain. This unit also has local audio inputs, denoted as audio 7 through 12. Just as described in connection with multiplexer unit 10, the several local audio signals are digitized in analog to digital converters 48a through 48f, and the modulated RF signal on line 20 is demodulated in a demodulator 50, thereby providing on the several input lines to multiplexer switches 52 of unit 12 seven inputs (six local audio and one remote from RF), each of which comprises a digitized sample of an audio signal. Multiplexer switches 52 provide a single serial bit stream on its common output line 54 to a modulator 56, which modulates all of the digitized samples upon an RF carrier to provide on output line 22 an RF signal that is modulated with the digitized samples of the local audio inputs to both multiplexer units 10 and 12.

Because, in the example under discussion, the first unit, unit 10, receives no remote input, it generates the repetitive timing frame sync and time slot signals which will be used by the entire chain. In this example under discussion, the second unit 12 receives a modulated RF signal in addition to its local audio inputs. The modulated RF signal also carries frame sync signals, from which a counter subject to the system clock generates the subframe and time slot signals. Therefore, to synchronize timing throughout the chain, the sync signals of the remote signal received on line 20 are employed for purposes of timing. Thus, the system ensures that the timing of the second multiplexer unit 12 will be the same as the frame and slot timing of the first multiplexer unit. Where, as previously described, the multiplexer unit receives no RF input, it provides its own frame and slot timing.

The third multiplexer unit 14, which is identical to each of the other two, is provided with its own local audio inputs, identified as audio 13 through audio 18, which are fed to six individual analog to digital converters 60a through 60f, and thence to the third unit multiplexer switches 62. The modulated RF output of the second multiplexer unit 12 is fed on line 22 as the remote input to the demodulator 64 of the third multiplexer unit 14, which removes the RF carrier from the digitized samples of this remote input and feeds a serial bit stream to the multiplexer switches for time division multiplexing together with the digitized versions of the local audio inputs from converters 60a through 60f. The output of multiplexer switches 62 is fed to the third unit modulator 66, which provides on output line 24, as the output of the entire chain of multiplexers, an RF signal upon which are modulated all of the inputs to all of the multiplexers.

The first subframe has its time slots S1 through S6 uniquely allotted to the digital samples of the local inputs audio 1 through 6 of the first multiplexer, as shown in FIG. 2a. The time slots of the second subframe, in the second multiplexer unit 12, are shown in FIG. 2b. Time slots S7 through S12 in the timing frames of the second unit are uniquely allotted to the local inputs of the second unit, and thus each time frame of multiplexer 12 has two data filled subframes. Subframe 3 is still empty in the second unit of the chain. As can be seen in FIG. 2b, subframe 1 of each frame of multiplexer unit 12 carries the digitized samples of the local inputs of multiplexer 10, subframe 2 of the second multiplexer unit time frame carries digitized samples of its own local audio inputs, and the subframe 3 of time frames of the second multiplexer unit are still blank.

The third multiplexer unit, like the second, receives a modulated RF signal and thus employs the frame sync of this RF signal to establish its own frame and slot timing. In this third multiplexer unit, as can be seen in FIG. 2c, each of the subframes, namely subframes 1, 2 and 3, is provided with data in all of the time slots, with the time slots 1 through 6 of subframe 1 still being uniquely allotted to local inputs of the first multiplexer unit, subframes S7 through S12 of subframe 2 being uniquely allotted to the local inputs unit 12, and the third subframe having its time slots uniquely allotted to the local audio inputs of the third multiplexer unit 14.

The arrangement enables one or more multiplexers to be added to the chain, simply connecting additional multiplexers in series. For example, should a system initially require only six audio inputs, it would then employ only a single one of the multiplexer units, which is capable of handling the six audio inputs. When such system is reconfigured and enlarged to handle an additional six audio inputs, it is not necessary to discard the original multiplexer and replace it with one of increased capacity. It is merely necessary to interconnect a second multiplexer unit, such as multiplexer 12, which uniquely receives the additional audio inputs, and to feed the modulated RF output of the first multiplexer to the appropriate input of the second multiplexer. The modulated RF output of the second multiplexer transmits the bit stream of digitized audio signals from all inputs of both multiplexer units as modulated on its RF carrier. Still further enlargement of the system may require use of additional local audio inputs, and thus one may simply add an additional multiplexer unit identical to those previously described, or such an additional unit may be inserted between any existing units, at any point in the chain.

Thus it will be seen that the use of this type of multiplexer unit enables simplified reconfiguration of the system to accommodate different numbers of inputs without either requiring initial use of excess capacity (except for one unused switch of the array of multiplexing switches) or scrapping of outdated units of too little capacity. Further, the several multiplexer units need not be located together, but may be conveniently located adjacent the input sources themselves. Such input sources, such as CD players, tape players and video tape decks are of relatively large size and are often desirably located at mutually different locations on an aircraft. The several digital multiplexer units may be located at such different locations, each adjacent its local input sources, without running large bundles of wires between locations.

Illustrated in FIGS. 3a and 3b is a block diagram of an exemplary passenger entertainment system controller (PESC) which includes a single multiplexer unit of the type illustrated in FIG. 1. FIGS. 3a and 3b form a single diagram when FIG. 3a is positioned immediately above FIG. 3b.

The local analog audio inputs to this exemplary controller and its multiplexer unit are 32 in number and designated as CH1 through CH32 inclusive. A modulated RF signal including a relatively low frequency carrier having video modulation and a higher frequency carrier having audio modulation is provided on an input line 70 as the remote input to this multiplexer unit of the controller. Thus the RF video on line 70 may comprise (a) a number of analog video signals, each modulated on its own carrier of a group of video carriers within the frequency band of about 50-300 megahertz and (b) a number of digitized audio samples serially modulated upon an audio RF carrier having a frequency of about 360 megahertz (well above the video carrier frequencies). This multiplexer unit accordingly may correspond to either of the second or third multiplexer units 12 and 14 of FIG. 1 in that it does receive the "remote" RF input. Each audio signal is input on a pair of lines, such as lines 72, 74 for channel 1, fed to a buffer 76 and then to the analog to digital converter 78, which provides, for example, 16 bits per sample. The 16 bit digitized sample is then compressed with, for example, a 4:1 compression ratio in a suitable data compressing processor, such as for example the digital signal processor model TMS320C14 made by Texas Instruments and denoted as compression logic 80 in FIG. 4. The output of the compression logic 80 is fed to a three state switch 82, having a control line designated as TSAE01, which is connected to and controlled by the similarly labeled output of a multiplexer timing circuit 84. Each of the 32 local audio inputs is fed through its own buffer, analog/digital converter, compressor and tri-state switch, which all are identical to those illustrated for channel 1 input. A plurality, such as five for example, of public address audio inputs are provided as indicated for PA zones 1 through 5, each on a pair of lines and each, like the other audio inputs, fed through its own buffer, analog to digital convertor, compressor and tri-state switch TS, which are controlled by switch inputs TSPA01 through TSPA05. The modulated RF with its video and two audio signals, on input line (coaxial cable) 70 is fed through a filter 86, which provides the low carrier frequency RF with its modulated video on a line 88, and the high carrier frequency RF component with its audio modulated thereon on a line 90. The high frequency carrier with its audio, on line 90, is demodulated in a demodulator 92 to remove the RF carrier and then decoded in a decoder 94, which recovers both data and sync signals present in the encoded audio that is fed to demodulator 92. It may be noted at this time that the digitized audio may be compressed and encoded, if deemed necessary or desirable, in one of several methods such as, for example, one arrangement that provides 5 bits out for every 4 bits in, and termed a "4B/5B NRZI Encoding Scheme". Such an encoding scheme is contemplated for a presently preferred embodiment of the invention but is not necessary for operation of the multiplexer units of the present invention. Thus, the digitized audio is compressed and encoded in a 4B/5B NRZI encoder provided in each multiplexer unit just prior to its modulator (see encoder 114 of FIG. 3a).

At the output of the decoder 94, then, appears a clock or data strobe on a line 96 and the frame sync on a line 98 which are contained in the encoded digitized samples modulated on the RF carrier that is received at input 70. This data strobe, which times the individual time slots, and the sync, which is the frame synchronizing signal, are fed to the multiplexer timer 84, which is a counter that provides the several indicated multiplexer switch operating outputs, including TSX, TSAE01 through TSAE32, and TSPA01 through TSPA05. This timer also provides on lines 102 and 104 an internally generated frame sync signal and a time slot or data strobe signal for use when such data strobe and sync signals are not available from the RF input (e.g. when there is no RF input to this multiplexer unit).

The data from the previous unit, which has been fed via RF input 70, is provided on a line 108 from the decoder 94 and thence to a tri-state switch 110, which is operated by the TSX signal from the timer 84. The several tri-state switches collectively comprise the switches of a conventional time division multiplexer, and are opened in sequence in accordance with control signals from the timer 84. All of the tri-state switches have their output connected in common to a single multiplexer output line 112. The signal of the single common line 112 comprises a composite frame, including the several subframes described above in connection with FIGS. 1 and 2. Thus the serial bit stream appearing on the common line 112 includes data in the time slots of its various subframes, as indicated in any one of FIGS. 2a, 2b and 2c, depending on whether the multiplexer unit illustrated in FIG. 3 is the first, second or third in the daisy chain. Thus, for example, if the unit illustrated in FIG. 3 corresponds to unit 12, which is the second of the units in the daisy chain of FIG. 1, then only subframes 1 and 2 have digitized samples in their time slots, whereas the time slots of subframe 3 have no data (see FIG. 2b). The composite data in the several subframes of each frame, on line 112, is then encoded in a 4B/5B NRZ1 encoder 114 (previously described), which is the companion to the decoder 94. Again, encoder 114 is contemplated for inclusion in a presently preferred embodiment but may be completely omitted (with omission of the corresponding decoder 94) from the described chain of multiplexer units because this encoding and decoding is not required for operation of the present invention.

The composite data bit stream from encoder 114 is fed on a line 116 to a modulator 118, which modulates the data bit stream on an audio RF carrier having a frequency in the order of about 360 megahertz. This provides an audio modulated RF carrier on a line 120 which is combined with the video modulated RF carrier on line 88 after the latter has been amplified in an amplifier 124 and fed via an RF video line 126 as one of the two inputs to a combining circuit 128. The other input to circuit 128 is the audio RF on line 120. The output of combining circuit 128 on line 130 comprises the modulated RF carrier output of the multiplexer unit illustrated in FIG. 3.

For purposes not connected with the operation of the multiplexer unit, the controller illustrated in FIG. 3 also includes a microprocessor 140, having a memory 142, and a plurality of inputs fed via an input buffer 144 and an input buffer 146 (see the lower end of FIG. 3b) that provides data and other control and monitoring information to the microprocessor. An output of the microprocessor is provided via an interface logic circuit 148 on a controller output line 150. Additional data from monitors at various points in the system may be provided as inputs to an input/output logic circuit 152 for the microprocessor 140. Various power levels used internally of the controller may be provided from a power supply 156, which uses inputs from lines 158 and 160.

Although the embodiments described herein, for purposes of exposition, multiplex audio and video signals that are modulated on RF carriers, it will be understood that principles of this invention are applicable to multiplexing signals of many other types whether or not audio or video and whether or not employing carriers of RF or other frequencies.

What is claimed is:

1. A chain of multiplexers comprising:
first and second multiplexer units,
said first multiplexer unit having a plurality of local inputs and an output,
said second multiplexer unit having a plurality of second unit local inputs and having a remote input connected to receive the output of said first multiplexer unit,
said first multiplexer unit including:
timing means for generating frame sync signals establishing a repetitive frame divided into plurality of subframes,
means in said first multiplexer unit for time division multiplexing said input signals and assigning all of said input signals to individual time slots in a selected one of said subframes, a second one of said subframes having no signals assigned thereto,
said first multiplexer unit having an output including signals of said selected subframe and bearing frame sync signals, said second multiplexer unit including:
means for multiplexing said second unit local inputs with the remote input from the output of said first multiplexer unit,
second timing means for establishing a second multiplexer timing frame based upon said frame sync signals of said first multiplexer unit output, said second multiplexer timing frame having said plurality of subframes,
said second timing means including means for assigning signals contained in the output of said first multiplexer unit to said selected one of said subframes and for assigning said second unit local inputs to said second one of said subframes to provide an output from said second multiplexer unit comprising said first multiplexer unit local inputs followed by said second unit local inputs.

2. The apparatus of claim 1 wherein said first and second multiplexer units are positioned at a distance from one another.

3. The apparatus of claim 1 further comprising:
a third multiplexer unit,
said third multiplexer unit having a plurality of third unit local inputs and having a remote input connected to receive the output of said second multiplexer unit,
wherein said means in said first multiplexer unit for time division multiplexing said input signals assigns all of said inputs to individual slots in a selected one of said subframes, a second and a third one of said subframes having no signals assigned thereto,
said third multiplexer unit including:
means for multiplexing said third unit local inputs with the remote input from the output of said second multiplexer unit,
third timing means for establishing a third multiplexer timing frame based upon said frame sync signals of said first multiplexer unit output, said third multiplexer timing frame having said plurality of subframes, said third timing means including means for assigning signals contained in the output of said second multiplexer unit to said selected one of said subframes and for assigning said third local inputs to said third one of said subframes to provide an output from said third multiplexer unit comprising first multiplexer unit local inputs followed by said second unit local inputs followed by said third unit local inputs.

4. A method for time division multiplexing different groups of input signals comprising the steps of:
providing a first group of inputs,
time division multiplexing digitized samples of the signals of said first group of inputs in a train of repetitive time frames each divided into a plurality of subframes, each having a plurality of time slots,
assigning the digitized samples of said first group of inputs to respective time slots of first individual one of said subframes,
transmitting as a remote signal said repetitive time frames and the subframes of each frame with said digitized samples in said first individual subframe, and at least one other subframe having no digitized samples,
providing a second group of inputs,
establishing a train of repetitive time frames synchronized with said first mentioned train and subdivided into said plurality of subframes and time slots,
time division multiplexing said remote signal with said second group of inputs, said last mentioned step of multiplexing comprising:
assigning digitized samples of said remote signal to time slots of said first individual one of said subframes,
providing digitized samples of a second group of inputs and assigning them to time slots of a second individual one of said subframes, and
providing an output signal comprising said time frames with digitized samples in said first and second individual subframes.

5. The method of claim 4 wherein said multiplexers are positioned at mutually displaced locations.

6. The method of claim 4 wherein said first group of inputs comprises the output of a first signal source located at a first position, and said second group of inputs comprises the output of a second signal source located at a second position displaced from said first position, said step of performing said first mentioned multiplexing being carried out at a location adjacent said first signal source and said step of multiplexing said remote signal being carried out at a position closely adjacent the location of said second audio source.

7. A daisy chain multiplexing system comprising:
a first audio source providing a first group of local analog audio inputs,
a first multiplexer unit comprising:
a plurality of analog to digital converters each connected to uniquely receive a different one of said local analog audio inputs and to provide digitized samples of said local inputs,
an array of multiplexing switches connected to receive said digitized samples and provide a composite stream of said samples,
multiplexer timer means for generating frame sync and time slot signals for establishing a repetitive frame divided into at least first and second subframes, each said subframe having a plurality of time slots,
said timer means including means for assigning digitized samples of said local inputs to the time slots of said first subframes and for keeping time slots of said second subframe free of digitized samples,
means for combining the frame sync and time slot signals with said composite serial bit stream of samples from said multiplexing switches to provide a combined first multiplexer unit output,
a second audio source positioned at a location remote from said first audio source and providing a second group of local analog audio inputs,
a second multiplexer unit positioned adjacent said second audio source and comprising:
a second plurality of analog to digital converters each connected to receive a different one of said second local analog audio inputs, and to provide digitized samples thereof,
a second array of multiplexing switches connected to receive said digitized samples from said second plurality analog to digital converters, one of said second group of multiplexing switches being connected to receive said combined first multiplexer unit output, said switches being connected to provide a combined second multiplexer unit output,
second multiplexer timer means in said second multiplexer unit responsive to the frame sync and time slot signals of said first combined multiplexer unit output for establishing a repetitive frame and time slots therefor for said second multiplexer, said repetitive frame of said second multiplexer being subdivided into at least first and second subframes,
said second timer means including means for uniquely assigning digitized samples of the first group of local audio inputs from said first source to a first one of said subframes and for assigning the digitized samples of the second group of local analog audio inputs to said second subframe to provide said combined second multiplexer unit output including in each frame thereof digitized samples of said first group of audio inputs from said first source followed by digitized samples of said second group of audio inputs from said second source.

8. The daisy chain multiplexer of claim 7 including modulator means connected to said first mentioned multiplexing switches for modulating said combined first multiplexer unit output upon an RF carrier to provide an RF carrier output having modulated thereon digitized samples of the local inputs from said first audio source and frame sync signals.

9. The multiplexer of claim 8 wherein said second multiplexer unit includes demodulator means for demodulating said RF carrier output and extracting frame sync and time slot signals therefrom, said second timer means being responsive to said frame sync signal for establishing frame synchronization and time slot positions of the composite signal combined second multiplexer unit output.

* * * * *